(12) United States Patent  (10) Patent No.: US 9,139,331 B2
Tavolino  (45) Date of Patent: Sep. 22, 2015

(54) STORAGE SYSTEM

(71) Applicant: Mark Tavolino, Woodridge, IL (US)

(72) Inventor: Mark Tavolino, Woodridge, IL (US)

( * ) Notice: Subject to any disclaimer, the term of this patent is extended or adjusted under 35 U.S.C. 154(b) by 273 days.

(21) Appl. No.: 13/768,976

(22) Filed: Feb. 15, 2013

(65) Prior Publication Data
US 2013/0221630 A1 Aug. 29, 2013

Related U.S. Application Data

(60) Provisional application No. 61/604,995, filed on Feb. 29, 2012.

(51) Int. Cl.
B65D 6/00 (2006.01)
B62B 3/00 (2006.01)

(52) U.S. Cl.
CPC .. B65D 7/12 (2013.01); B62B 3/002 (2013.01)

(58) Field of Classification Search
None
See application file for complete search history.

(56) References Cited

U.S. PATENT DOCUMENTS

| 3,146,505 | A | | 9/1964 | Hansen | |
|---|---|---|---|---|---|
| 3,563,624 | A | * | 2/1971 | Stice | 312/111 |
| 4,227,758 | A | | 10/1980 | Clare | |
| 4,781,307 | A | * | 11/1988 | Ferro | 221/131 |
| 5,199,581 | A | * | 4/1993 | Arnold | 211/106 |
| 5,339,976 | A | | 8/1994 | Thornton | |
| 5,495,960 | A | | 3/1996 | Lam | |
| 5,531,517 | A | * | 7/1996 | Alpen | 312/111 |
| 5,845,790 | A | | 12/1998 | Smith | |
| 6,276,550 | B1 | | 8/2001 | Cherrington | |
| 7,156,249 | B2 | | 1/2007 | Heinrichs | |
| 7,159,730 | B2 | | 1/2007 | Rumpel | |
| 7,311,202 | B2 | | 12/2007 | Chen | |
| 7,556,170 | B2 | | 7/2009 | Vroon | |
| 7,621,421 | B2 | | 11/2009 | Ohayon | |
| 7,748,554 | B2 | | 7/2010 | Murphy | |
| 7,780,026 | B1 | | 8/2010 | Zuckerman | |
| 7,784,624 | B1 | * | 8/2010 | Pinto | 211/85.7 |
| 2003/0173875 | A1 | * | 9/2003 | Saravis | 312/111 |
| 2009/0166356 | A1 | | 7/2009 | Tsai | |

* cited by examiner

Primary Examiner — J. Allen Shriver, II
Assistant Examiner — Hilary L Johns
(74) Attorney, Agent, or Firm — Levenfeld Pearlstein, LLC

(57) ABSTRACT

A storage assembly is provided that includes plural bins having registering vertical dovetail slots. Connecting rods having reverse expanding dovetail formations are used to slide into the registering vertical dovetail slots of the side-by-side bins to fix the side-by-side bins together. The same dovetail slots on the bins can be used to mount accessories such as golf bag retainers, baseball bat racks, storage bins or other components.

16 Claims, 24 Drawing Sheets

STORAGE SYSTEM

This application claims priority from provisional application No. 61/604,995 filed Feb. 29, 2012.

BACKGROUND OF THE INVENTION

The present invention pertains to a storage system having modular components and means for easily attaching accessories. Various modular storage systems are known. For example, U.S. Pat. Nos. 7,159,730 and 7,156,249 disclose foldable container units which can be connected to each other. The foldable container units in U.S. Pat. No. 7,156,249 have a support base and panels which are interlocked using a latching mechanism to connect the panels. The foldable container in U.S. Pat. No. 7,156,249 is vertically stackable and secured in their stacked position as Illustrated in FIG. 14, wherein members on the top surface of the bottom container engage with members on the bottom surface of the top container. The foldable container in U.S. Pat. No. 7,159,730 discloses side panels which are connected to the base. The side panels connect to the base at hinges, wherein hinge clips on the side panels engage with the hinge pins on the base. The container units in U.S. Pat. No. 7,156,249 are also connectable horizontally via crate connection assemblies which use receiver sockets that receive connection links therein.

U.S. Pat. No. 7,556,170 and U.S. Pat. No. 5,495,960 illustrate different configuration of containers which can be connected together. U.S. Pat. No. 7,556,170 discloses containers which provides horizontal access to the containers (FIG. 3A), as well as containers with fabric pouches, which can be disposed in connection either on top of or on the bottom of (FIGS. 4-5) another type of storage container.

U.S. Pat. No. 5,845,790 and U.S. Patent Application Publication 2009/0166356 disclose connecting assemblies for joining modular storage units at the corner. In U.S. Patent Application Publication 2009/0166356, the connectors are used to connect a plurality of panels to form the modular storage unit, as well as to connect adjacent storage units horizontally or vertically. In U.S. Pat. No. 5,845,790, the connecting member has a circular walled periphery which engages with an arcuate slotted portion on each of the storage units. The connectors allow the storage units to be organized at various angles to adjacent storage units.

U.S. Pat. Nos. 7,780,026, 7,748,554, 7,621,421, and 6,276,550 disclose modular storage units with interlocking mechanisms on the surfaces of the storage containers. U.S. Pat. No. 7,621,421 discloses an insert for partitioning the storage units into compartments in accordance with the user's needs.

U.S. Pat. Nos. 7,311,202, 5,339,976, 4,227,758 and 3,146,505 disclose modular storage units which can be connected to each other using a separate connecting device. U.S. Pat. No. 7,311,202 discloses that adjacent modular units are connected to each other by being connected via screws, to a common connector. U.S. Pat. No. 5,339,976 discloses a plurality of storage units with protruding members with an opening through which a removable insertion can be disposed to join the storage units. U.S. Pat. No. 4,227,758 discloses a plurality of modular storage units which can be connected to each other by being connected to a common support frame or retaining member which provides channels that engage with the edge portions of the containers. U.S. Pat. No. 3,146,505 discloses a plurality of storage units which can be connected at the corners of the storage units via a pin or clip member suitable for joining a plurality of adjacent corners.

The present inventor has recognized that it would be desirable to provide for the connection of storage units which use an insertion pin within a joined vertical groove, or use a vertical insertion pin through protruding members The present inventor has recognized that it would be desirable to provide modular storage units that may be configured as a unit suitable for the support of a golf bag, and other athletic equipment.

SUMMARY OF THE INVENTION

The invention is a modular storage system comprising various individual storage units attachable to each other along horizontal interfaces. Individual storage units can provide different storage configurations. Storage units can be configured to provide sub compartments within the storage region, or to comprise storage units accessible from a horizontal or a vertical plane. Storage units may be a region of space comprising features to form a support system for particular items such as golf bags, and other athletic equipment.

The storage units have a bottom surface with a plurality of side walls. The bottom surface and the walls are joined together to form an upright, expanded configuration from a collapsed configuration, for use. Side walls and bottom surfaces are removeably connected. A support post extending from the bottom surface is used to position and connect the side walls at each corner. Various other mechanisms for effectuating the removeable connection of the sidewalls to each other and to the bottom surface can be used.

The storage system can be arranged as desired by the user and secured into position by the user. To secure one modular storage unit to another, a vertical insertion pin is inserted along a registered or common vertical groove on the surface of adjacent storage units. Each storage unit has a surface groove which faces each other when storage units are placed side by side. When faced against each other, the grooves form a joint vertical groove with a cross section within which the insertion pin is keyed to fit. In addition, the storage assembly has the first storage bin including a base and a base clip fastens to the base of the first storage bin and the base clip capable of mating the first storage bin to the second storage bin at the base in a back to back orientation.

The storage assembly having the base clip comprising a flat, rectangular base member having a male boss at each hand end and the base having a generally triangular shaped slot; the slot for receiving a male boss and the boss having an enlarged head and the boss sliding from a broad side of the slot toward a tapered side of the slot so that the enlarged head of the boss is trapped within the slot.

In an embodiment the invention provides for a storage bin comprising a compartment defined by four walls, a first vertical slot formed in a first wall and a second vertical slot formed in a second wall the first slot having a first interior shape and the second slot having a second interior shape being uniform with the shape of the second slot, a fixing rod having a first side and a second side, a shape of the first side being symmetric to a shape of the second side, the first side of the fixing rod mounted within the first vertical slot and the second side of the fixing rod protruding beyond the first wall and capable of mating with a slot having the first interior shape in order to secure one other component to the storage bin. The storage bin having the other component comprising one of a similar storage bin; a shelf; a basket; on accessory; a hook; and a rack.

The storage bin wherein the fixing rod comprises the first side having a dovetail shape running longitudinally along the length and the second side having a dovetail shape as a mirror image of the first side so that the first vertical slot having a reciprocal dovetail shape sliding receives the first side of the fixing rod and a third slot of the other component having a uniform shape to the first slot for receiving the second side of the fixing rod.

Numerous other advantages and features of the present invention will be become readily apparent from the following detailed description of the invention and the embodiments thereof, and from the accompanying drawings.

DETAILED DESCRIPTION

Figure 1:
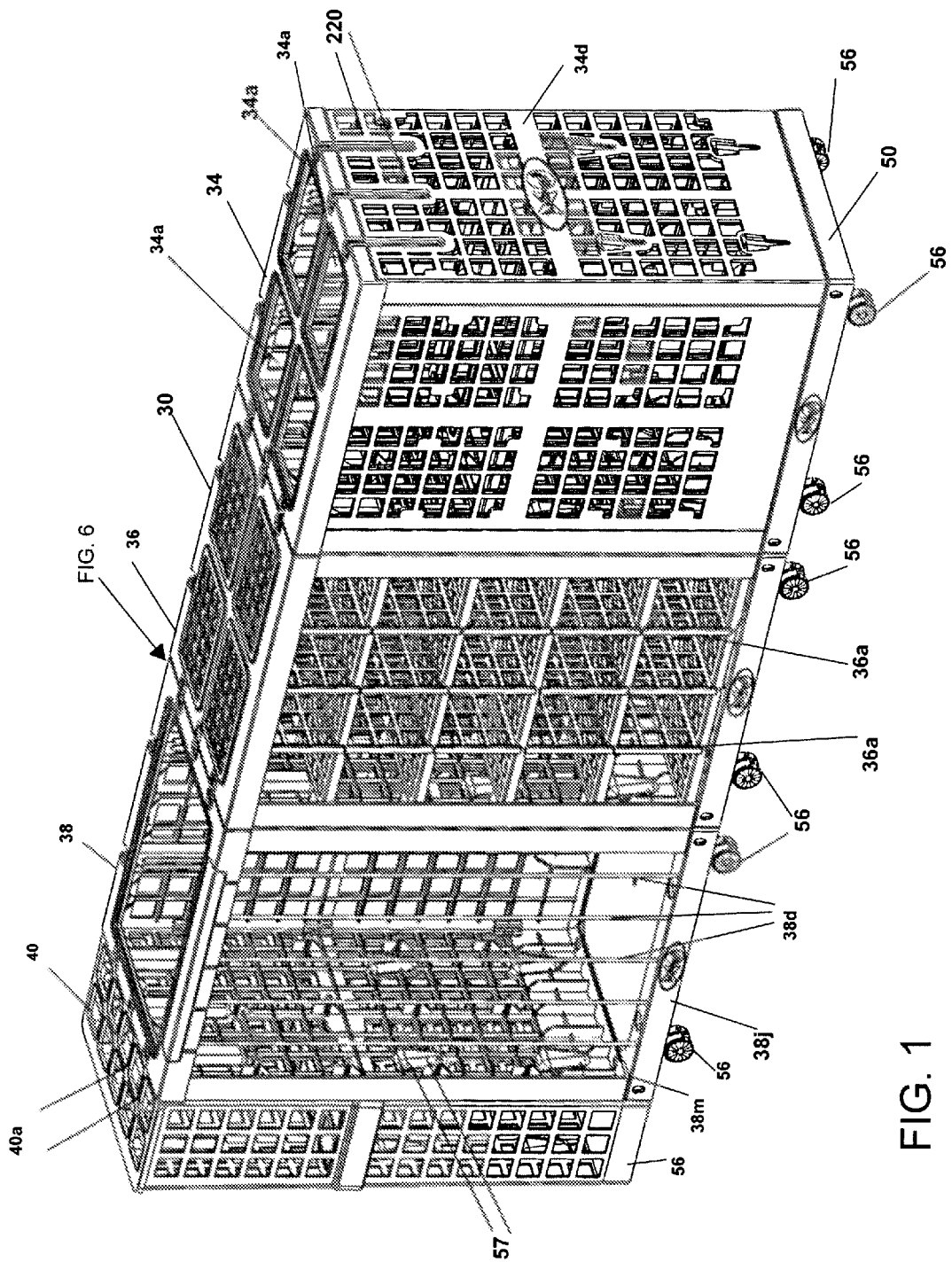
FIG. 1 is a front perspective view of the a storage assembly according to the invention.

While this invention is susceptible of multiple embodiments in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates storage assembly 30 in accordance with an exemplary embodiment of the present invention. For the most part the storage assembly is composed of plastic. The depicted storage assembly 30 includes a divided vertical access bin 34, a horizontal access bin 36, a hopper bin 38 and a covered vertical access bin 40. Each bin 34, 36, 38 and 40 includes a bottom solid platform 50 or bottom wall that is supported on wheels or casters 56. The vertical sidewalls of each bin are attached to each adjacent sidewall and to the platform 50 by fasteners, snap connections plastic welding or other known method. Side supports or brackets 57 can be provided on the inside of each wall for the provision of adding shelves or assembling internal compartments. In most cases, four wheels 56, arranged in a grid pattern, are provided for adequate rolling stability of each bin 34, 36, 38, 40, but for narrow bins such as the vertical access bin 42, only a pair of wheels may be provided where stability of the bin 40 is achieved by being attached to adjacent bin 38. Although wheels are show, the invention also encompasses simple, non-rolling supports such as legs. The bins are made up of lattice-work walls but solid walls are also encompassed by the invention.

The bins 34, 36, 38, 40 are attached together to form an assembly as described below. The divided access bin 34 includes four openings 34a and is useful for storing elongated articles such as golf clubs, baseball bats, umbrellas and the like which can be supported vertically within the opening 34a. In an alternate embodiment items such as garden tools, lawn tools, work tools, shovels or other sports equipment may be stored in the bins 34, 36, 38 or 40.

A-horizontal-access bin 36 provides a plurality of compartments or "cabbies" 36a are useful for storing items such as golf shoes, other athletic shoes, and small items which would be more difficult to retrieve if merely dropped into a deep vertical access bin. The hopper bin 38 is effective for storing large bulk items such as basketballs, footballs, skates and the like.

Figure 14:
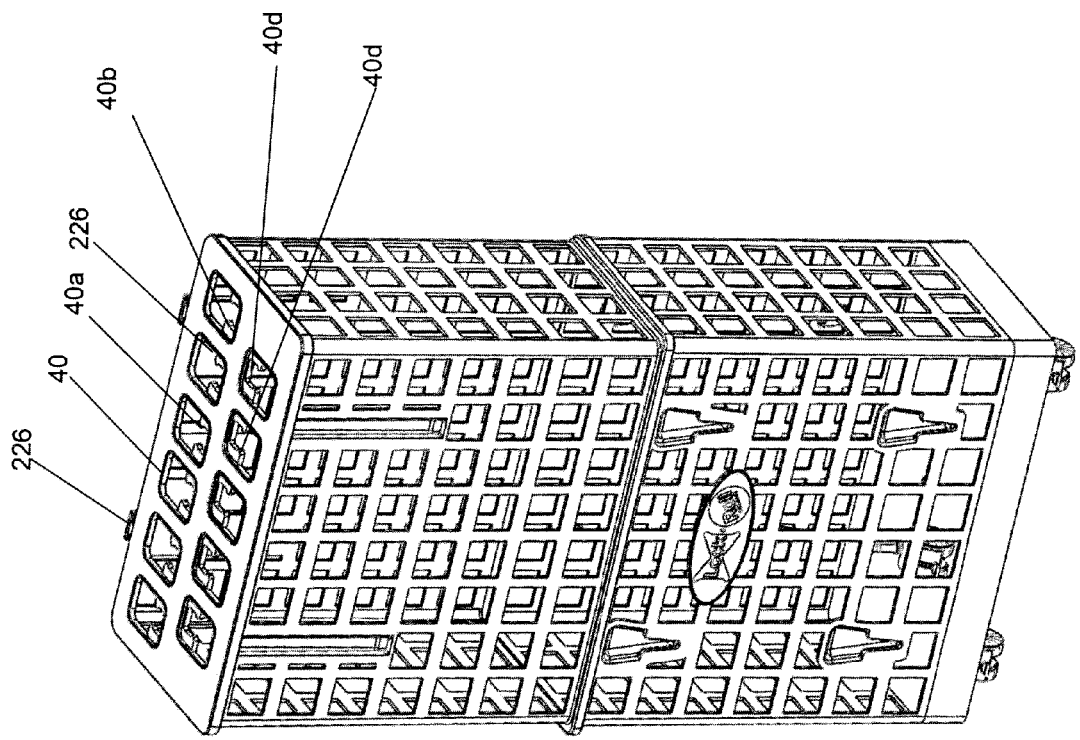
FIG. 14 is an enlarged perspective view of a portion of FIG. 1.

The covered vertical access bin 40 is similar to the divided access bin 34 but having smaller openings 40a through a top thereof which provide entry and guidance or support for long articles such as hockey sticks. As shown in FIG. 14, beneath the openings 40a is a resilient rubber insert 40b having resilient gripping jaws 40d for holding the hockey sticks vertically upright, i.e., to prevent the hockey stick from tipping over by gripping the rectangular cross-section of the hockey stick.

Figure 2:
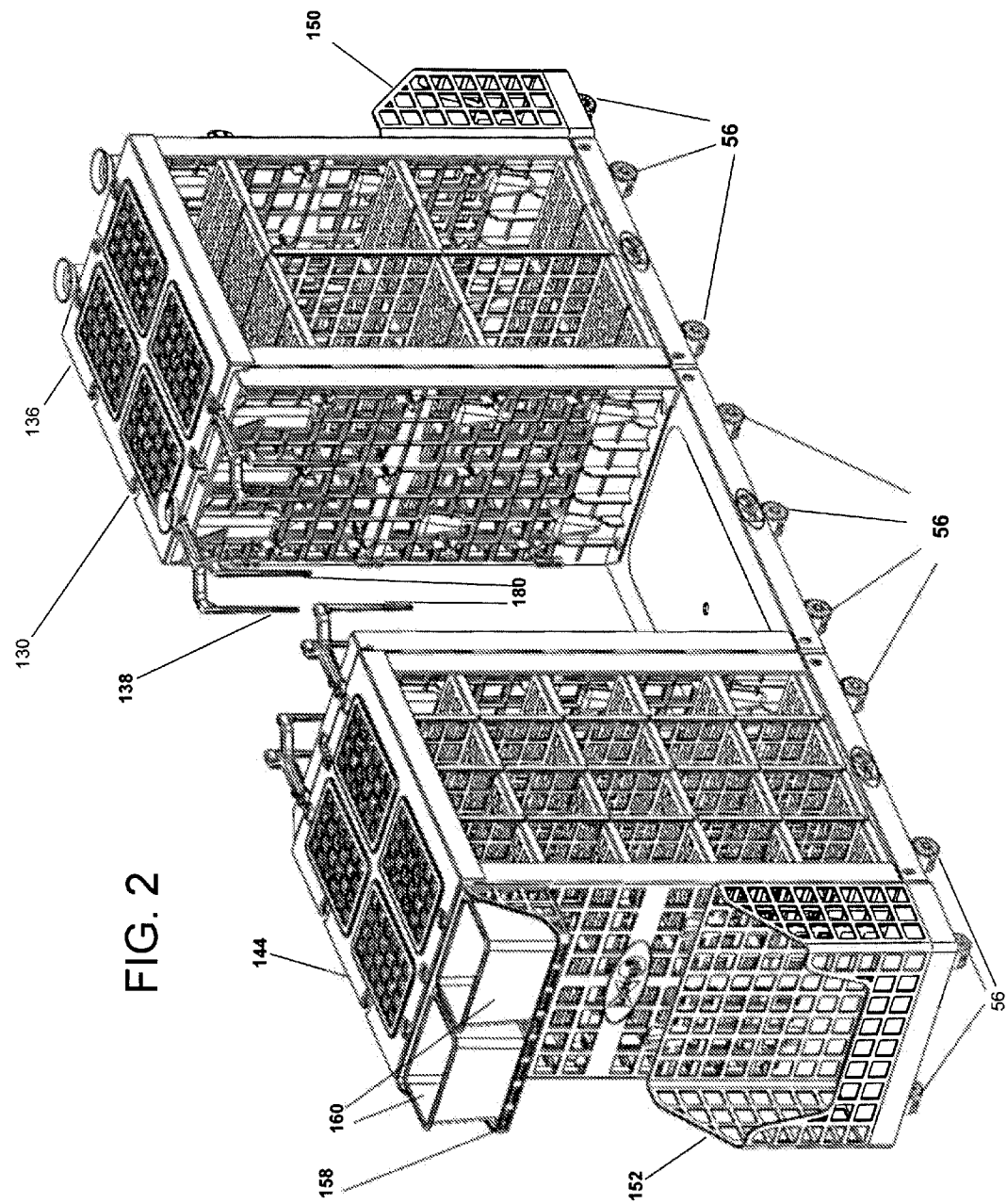
FIG. 2 is a front perspective view of an alternate configuration of a storage assembly according to the invention.
Figure 3:
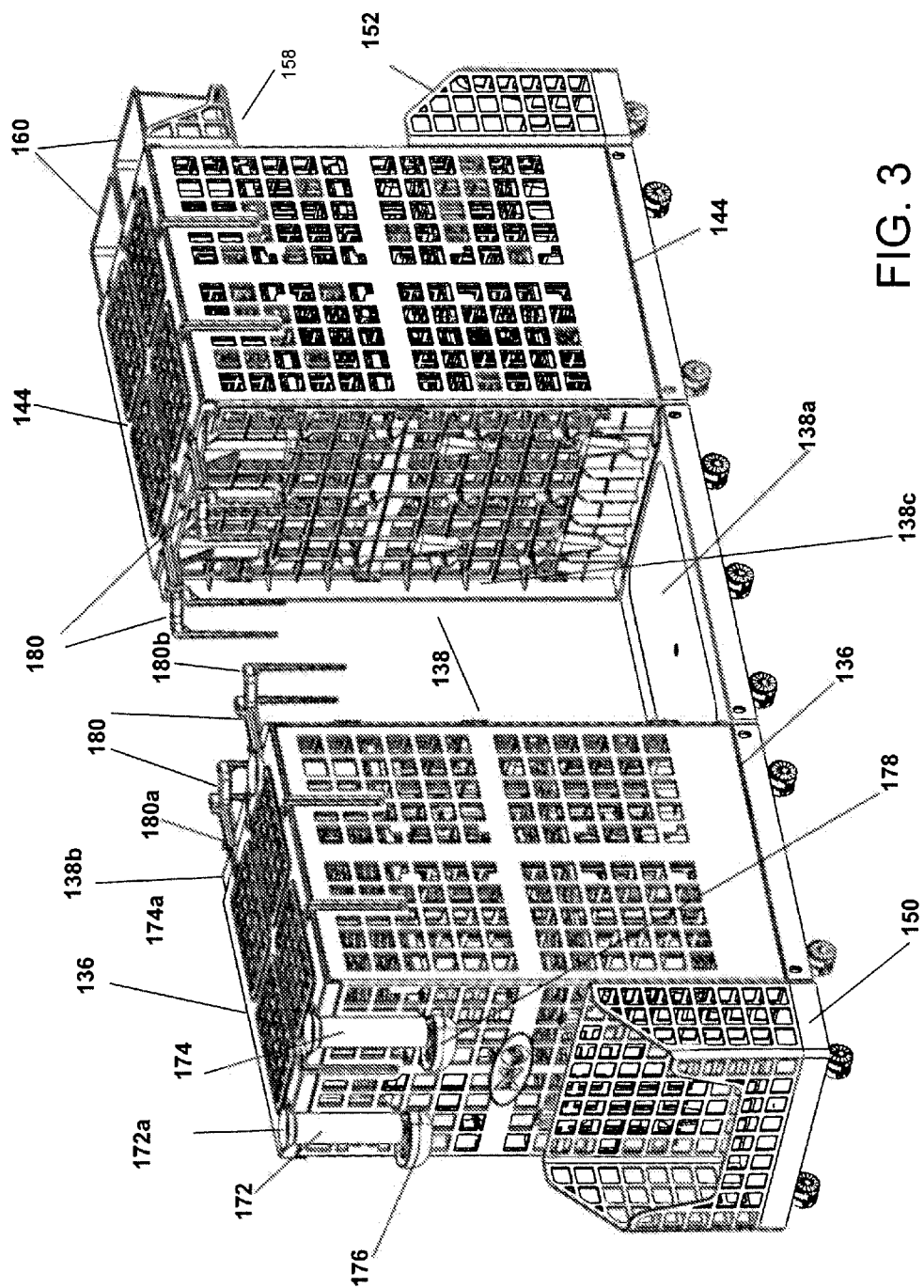
FIG. 3 is a rear perspective view of the storage assembly of FIG. 2.

FIGS. 2 and 3 illustrate an alternate assembly 130 that includes a horizontal access bin 136, open station 138 and a further horizontal access bin 144. Short bins 150, 152 are assembled on opposite ends of the assembly 130. On one end of the assembly 130 is mounted a container shelf 158 holding two removable containers 160. The container shelf 158 is mounted above the short bin 152. The container shelf can include an upright back wall with two dovetail bases 158a, like the dovetail part 306 shown in FIG. 8 (described below) or the dovetail part 179 shown in FIG. 13 (described below) which bases 158a can be slid-downward into two slots 220 in the outer sidewall of the bin 144 shown in FIG. 9.

Figure 12:
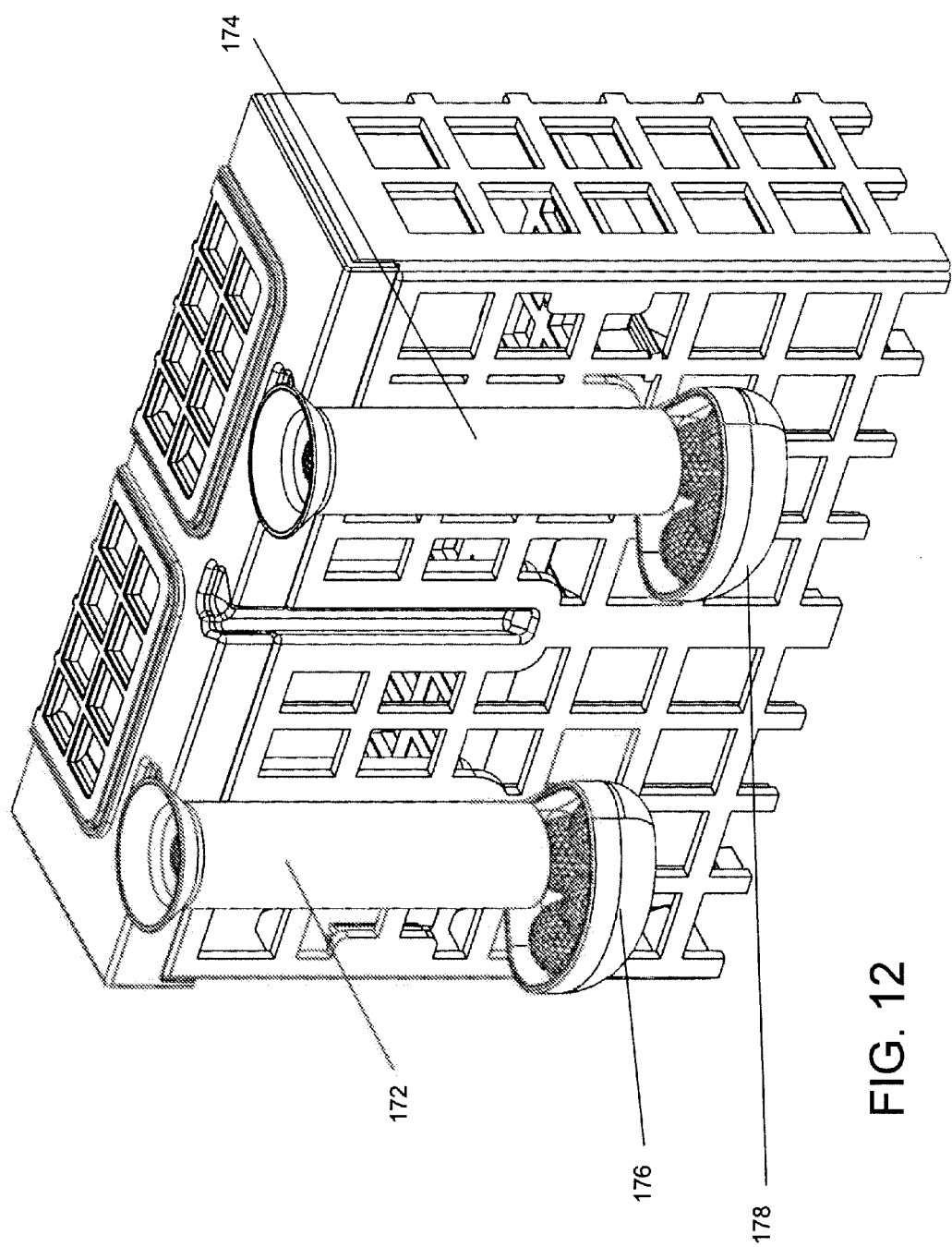
FIG. 12 is an enlarged fragmentary perspective view taken from FIG. 3.
Figure 13:
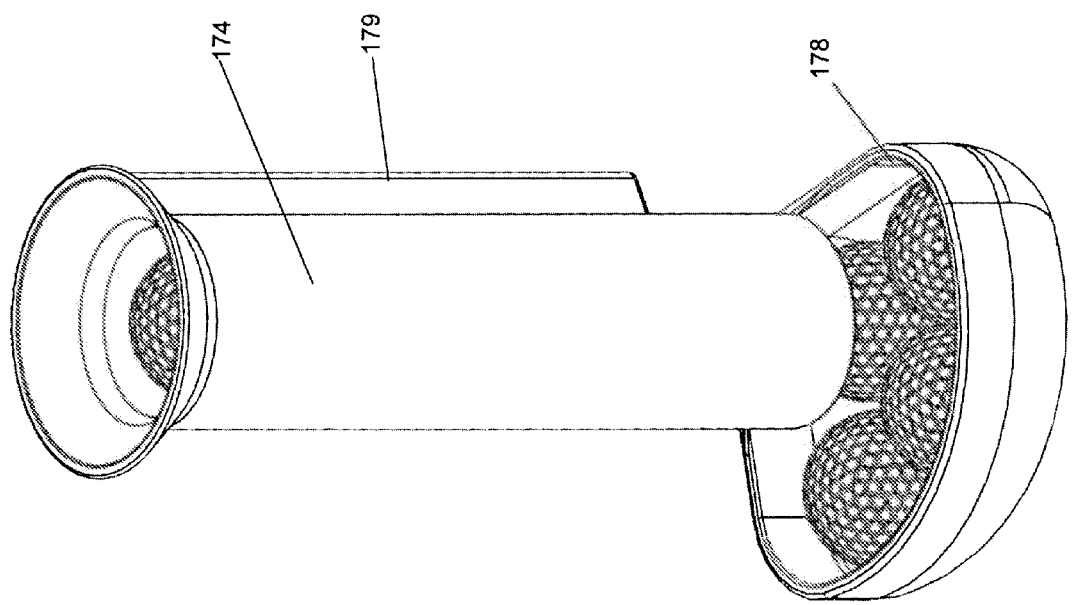
FIG. 13 is an enlarged perspective view taken from FIG. 12.

On an opposite end of the storage assembly from the shelf 158 are arranged first and second fill tubes 172, 174 which have flared open ends 172a, 174a having open bottoms which feed attached cups 176, 178, respectively. Small articles such as golf balls can be thrown into the tubes and collected in the cups and tubes as shown in FIGS. 12 and 13. As shown in FIG.

13, each tube and. cup combination instead by a single, flared dovetail rib 179 that slides into a dovetail slot 220 on a bin wall (described below).

A plurality of retainer hooks 180 are mounted on sides of the bins 136, 144 and overhang the open area 138, particularly a bottom wall 138a. Each hook 180 includes a base portion 180a with a double dovetail formation that engages registered dovetail slots 220 (described below) on side by side bin walls, particularly the walls of the respective bin 136, 144 and side walls 138b, 138c of the open area 138 arranged adjacent to the bins 136, 144, respectively, as shown more clearly in FIG. 9. The sidewalls 138b, 138c are fastened to the bottom 138a by attachments 138f and are fixed to the bins 136, 144 using the base portions 180a of the hooks 180. The base portions 180a have a double dovetail flare like the rods 228 rand fit identically into registered dovetail slots 220 of the sidewalls 138b and the sidewall of the bins 136, and of the sidewall 138c and the sidewall of the bin 144, respectively. Each retainer hook 6, includes a downwardly directed, forked hook end 180b fits into the open end of a golf bag which can be rested on a bottom wall 138a to stabilize the golf bag on the bottom 138a prevent tipping of the golf bag.

Figure 4:
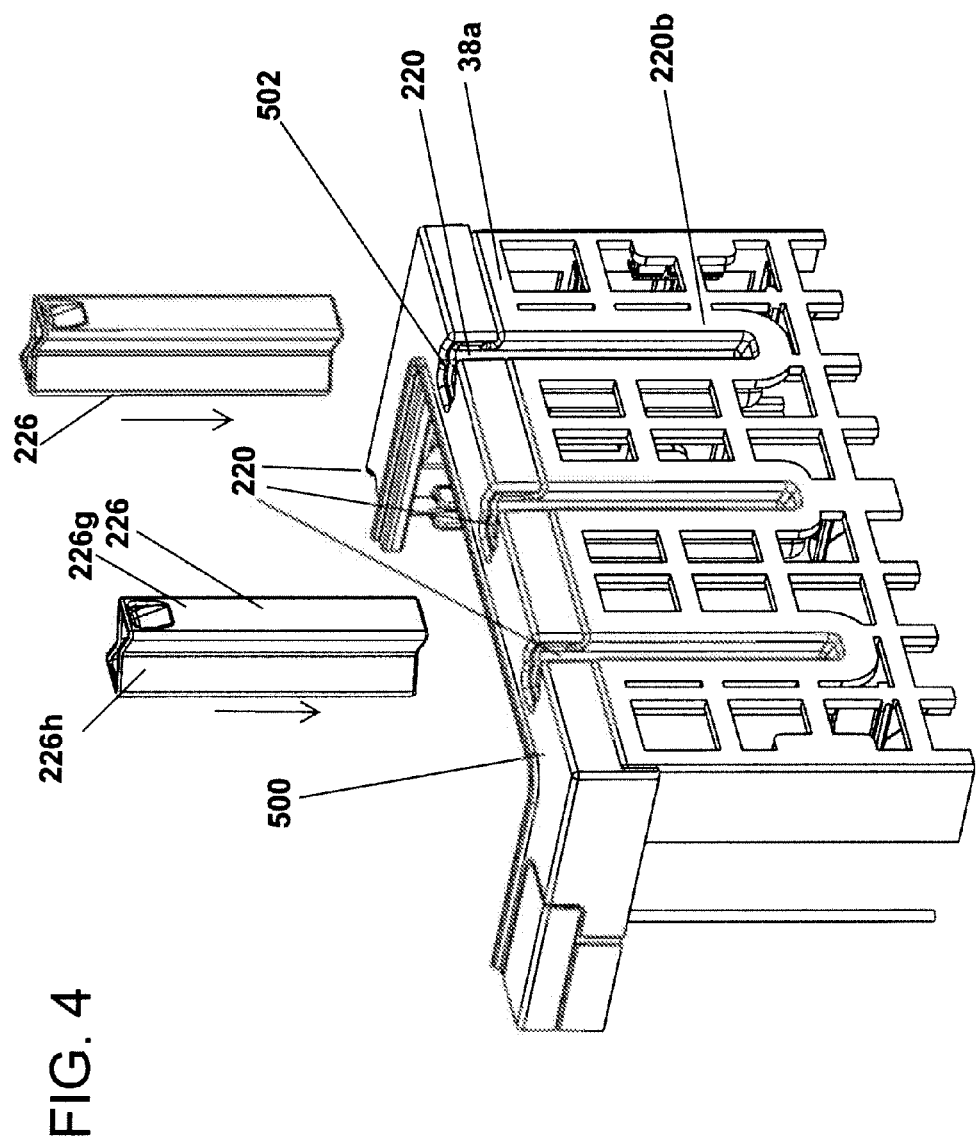
FIG. 4 is a fragmentary, enlarged, exploded, perspective view of a portion of FIG. 1.
Figure 5:
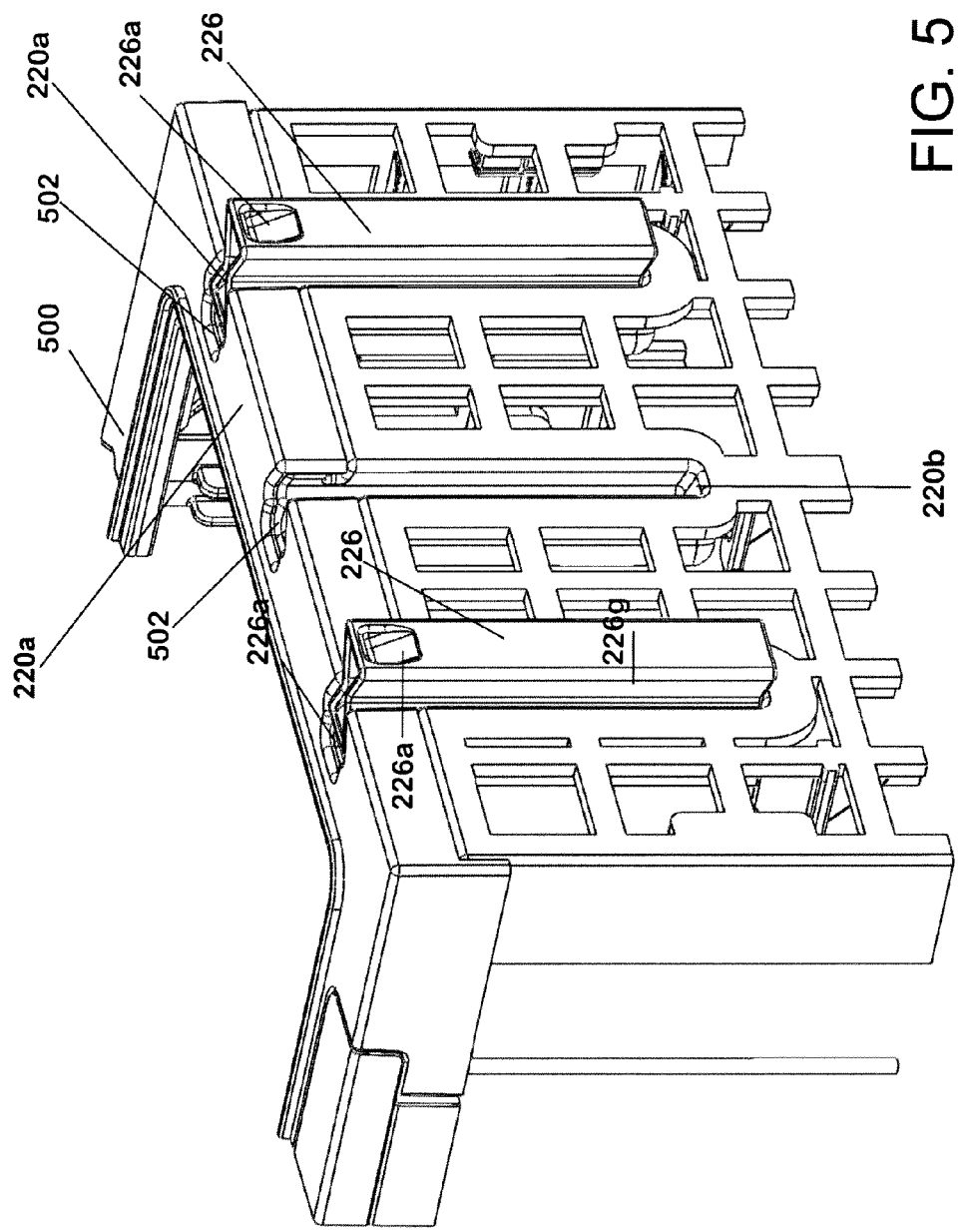
FIG. 5 is a fragmentary, enlarged, perspective view of FIG. 4 shown in a partially assembled state.
Figure 6:
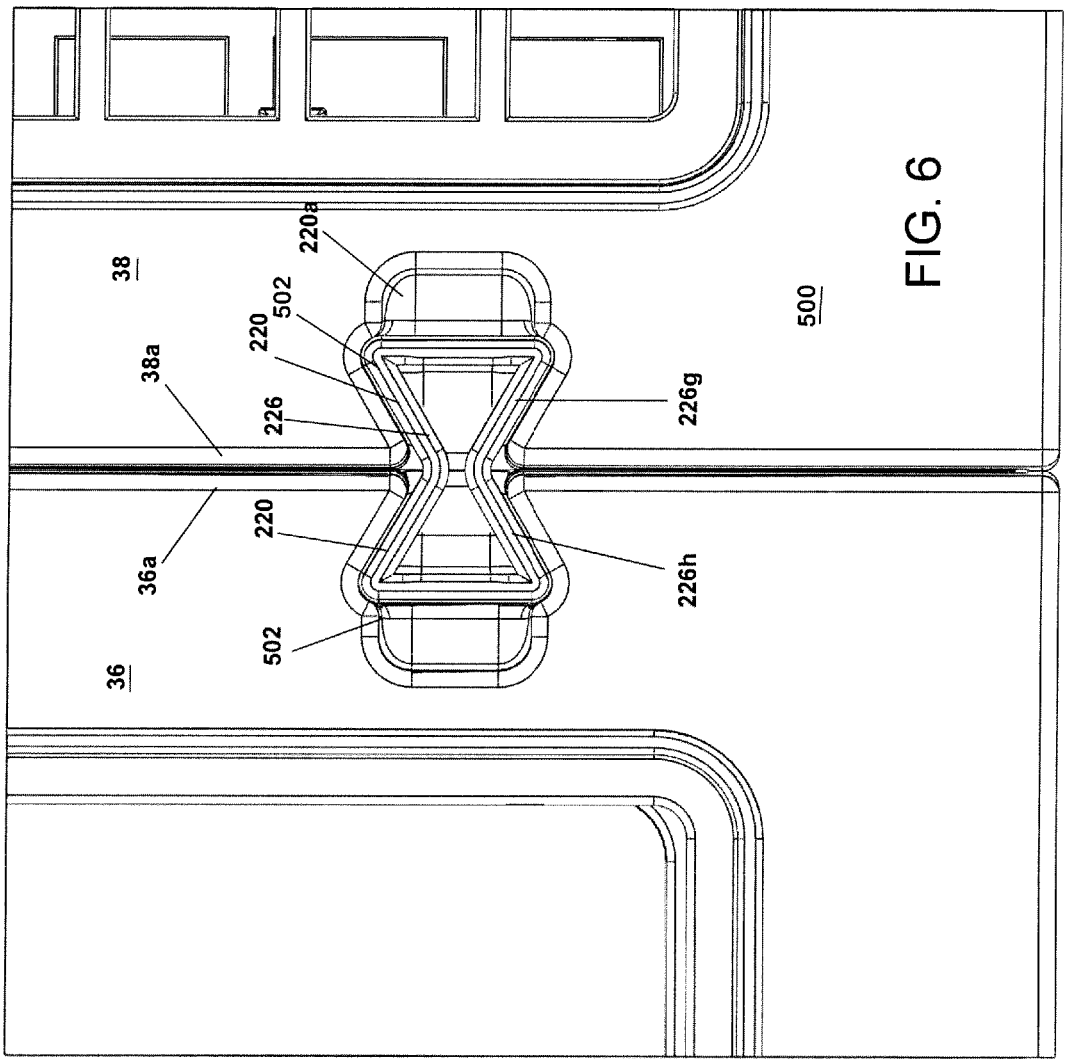
FIG. 6 is a fragmentary enlarged plan view taken from FIG. 1.
Figure 7:
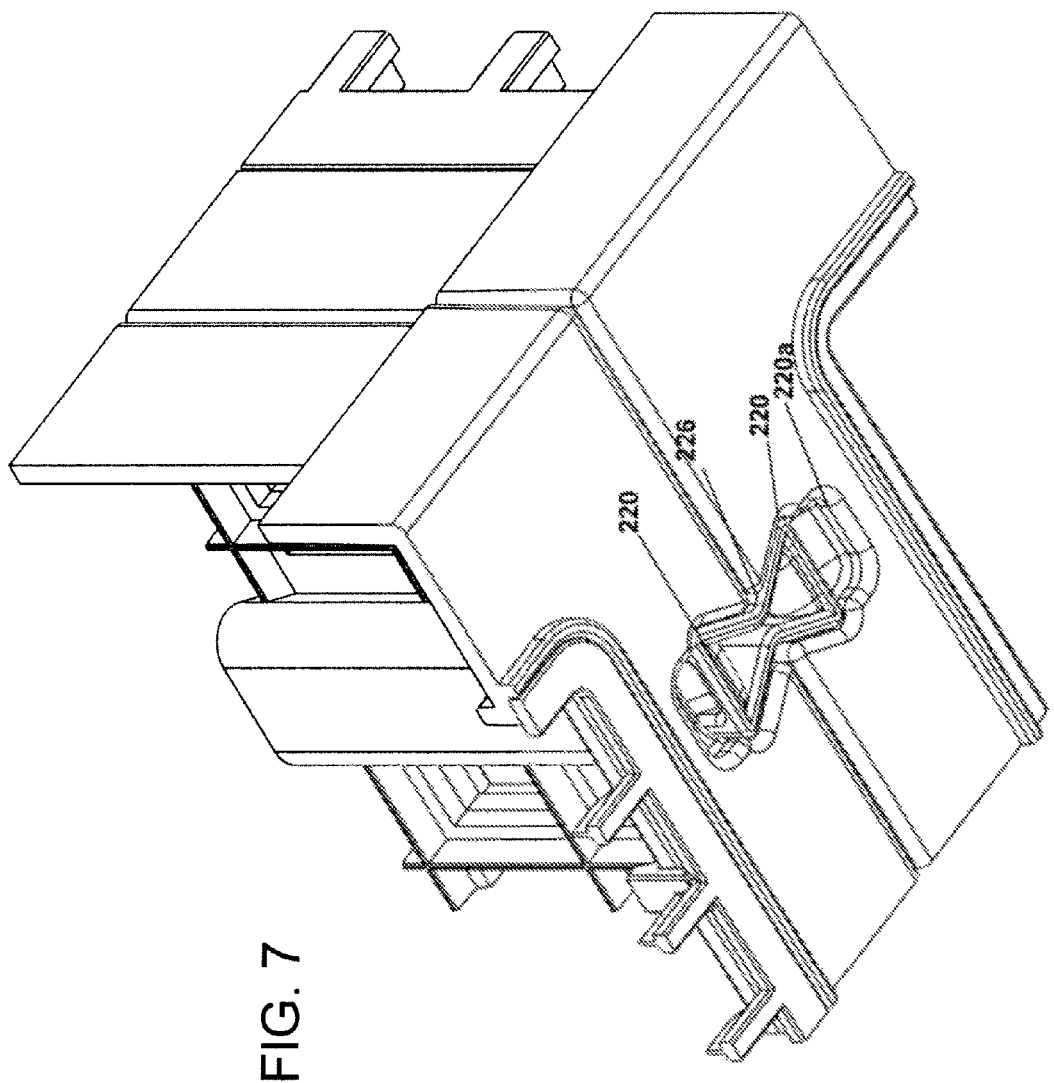
FIG. 7 is a fragmentary enlarged perspective view of FIG. 6.

FIGS. 4-7 illustrate the mechanism for attaching adjacent bins together. Although the bin 38 is shown, it is to be understood that the same mechanisms are used to connect all the various bins together. At spaced-apart upper positions on sidewalls 38a of the bin 38, are arranged vertically extending dovetail slots 220. By dovetail it is generally meant triangular or truncated triangular or curved triangular, or the like. As explained below, a top plate 500 also includes top openings 502 (FIGS. 16-18) that register with and correspond in shape to a top of the dovetail slots 220. Dual flared dovetail fixing rods 226 having in cross-section oppositely expanding dovetail shapes, are used in which each dovetail flared half 226h, 226g is slid downward to engage one dovetail slot 220 of opposing registered dovetail slots of side by side bins, to fix the two bins together against at least horizontal separation; For clarity of description, only one side of the mating of the fixing rod and bin sidewall is shown in FIGS. 4 and 5. To fix two bins together, the bins are pressed side-by-side in close proximity and the dual dovetail fixing rods 226 are slid down into a pair of registered dovetail slots as illustrated in FIG. 6, with one part or flare of the dovetail fixing rod entering the slot of one bin and the opposite part or flare of the dovetail fixing rod entering the slot of the other bin. To permit removal of the dovetail fixing rods once installed, each fixing rod 226 includes an indentation 226a on opposite parts or flares at the top. Each dovetail slot also provides an indentation 220a at a top thereof. The indentations 220a, 226a are substantially in registry and allow a user's finger to partially extend down into the slot 220 to enter the indentation 226a to exert a vertical, upward removal force on the fixing rod 226. Each slot 220 has a termination or bottom 220, 1:4 that limits the downward insertion of the fixing rod 226 into the slot 220, as shown in FIGS. 4 and 5.

Figure 8:
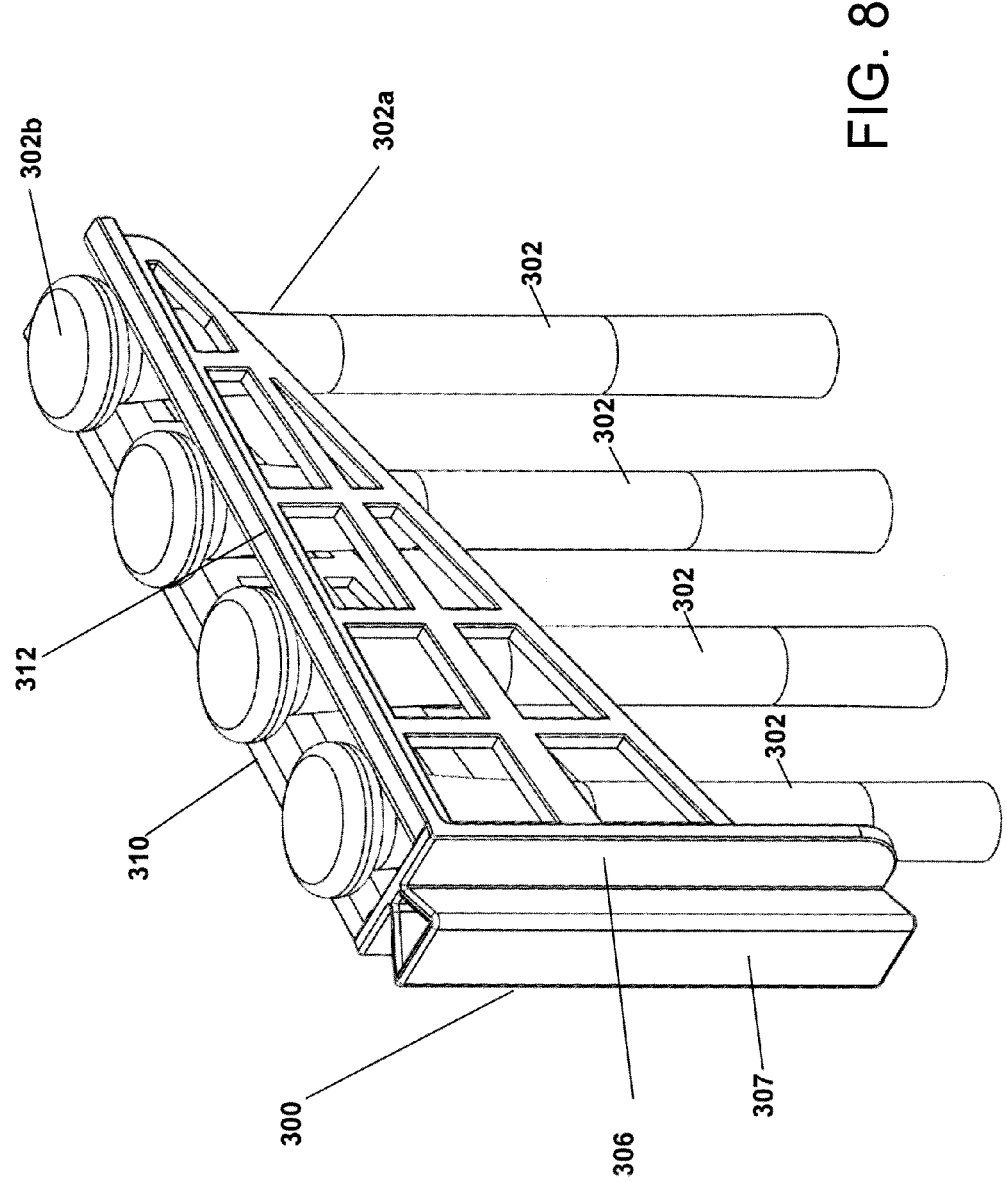
FIG. 8 is perspective view of an accessory mount to be used with the embodiments of FIG. 1 and FIG. 2.
Figure 9:
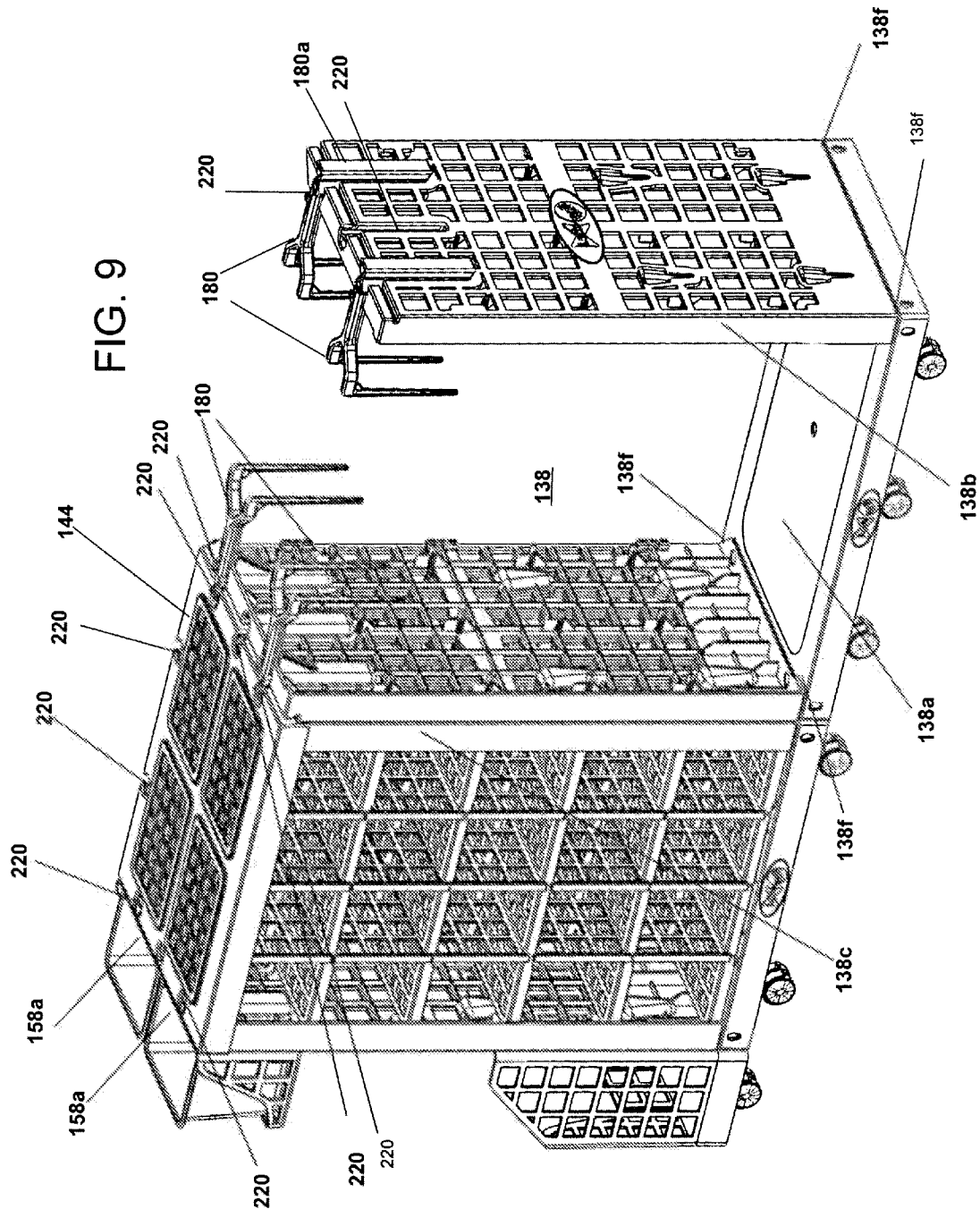
FIG. 9 is a perspective view similar to FIG. 2 but with a module removed to see underlying parts.
Figure 10:
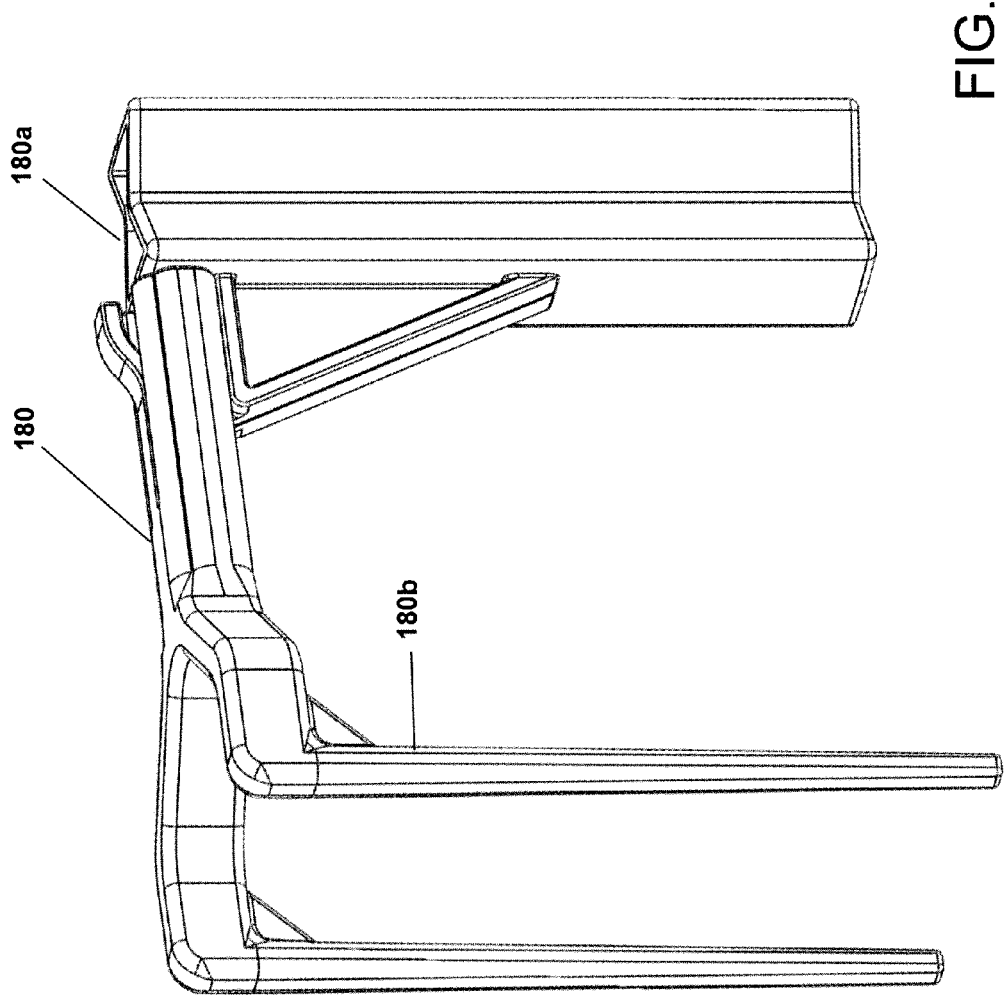
FIG. 10 is an enlarged perspective view of a golf bag retainer taken from FIG. 9.

FIG. 8 illustrates an enhancement to the exemplary embodiment of the invention wherein an accessory 300 in the form of a rack for a plurality of baseball bats 302 includes a base 306 having a single dovetail cross-section formation 307 and carries substantially horizontally projecting and parallel rails 310, 312 separated far enough to pass The narrow handle 302a of baseball bats but close enough to restrain the cap 302b of the baseball bat. The accessory 300 is installed into a slot 220 such as shown in FIG. 4 by sliding the formation 307 down into the slot 220 on an outward facing sidewall such as the sidewall 34d shown in FIG. 1, in the same manner as the fixing rod 226 is slid down into a slot 220. Once into the slot 220, the associated bin supports the accessory 300 with the rails 310, 312 projecting substantial horizontally to hold and hang baseball bats outward of the assembly or into an open area such as the area 138 as shown in FIG. 2.

Figure 11:
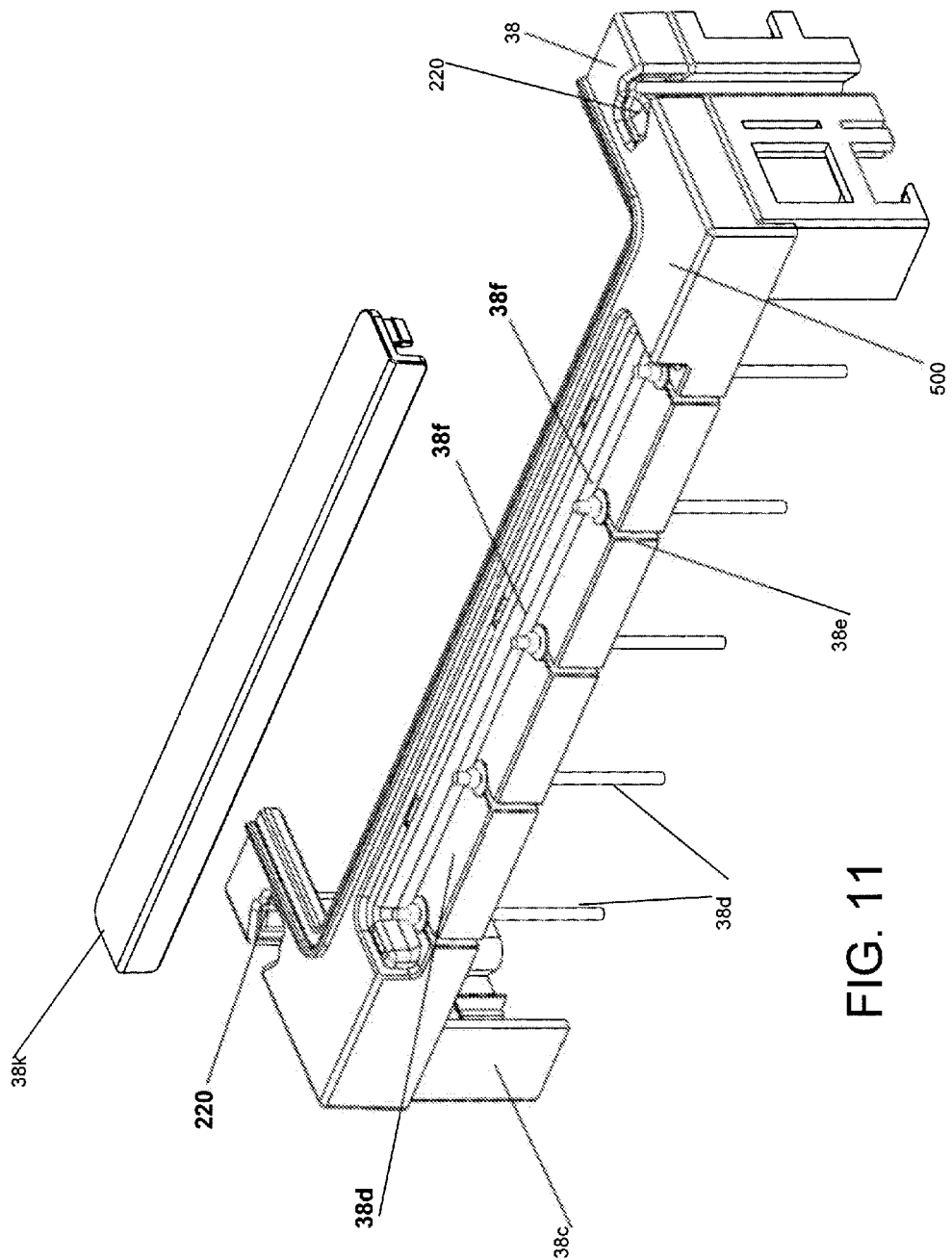
FIG. 11 is an enlarged fragmentary, exploded perspective view of a portion from FIG. 1.

FIG. 11 illustrates details of the bin 38 wherein a front wall 38c of the bin 38 is being slid through slots 38e and retained from pulling through the slots vertically by heads or clamps 38f. Bottom ends of the chords 38d are held in a similar fashion to a bottom rail 38j, shown in FIG. 1. A top cover 38k snaps onto the rail 38d to smooth the bin appearance and cover the top of the cords. The cords provide for retainage of bulky items that might stretch the bin and allow removal of large items from the bin by forcibly separating the elastic cords.

Figure 15:
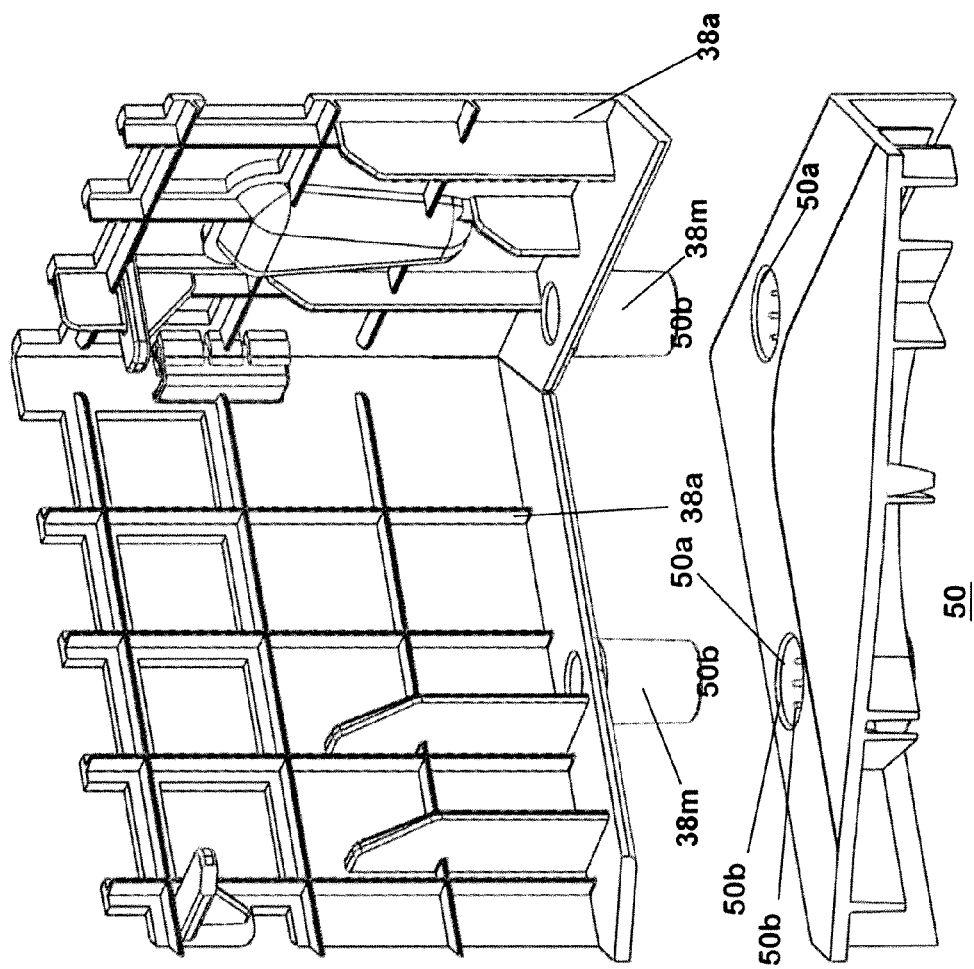
FIG. 15 is an exploded perspective view of a typical attachment of sidewalls of bins to platforms.

FIG. 15 illustrates one method of attaching sidewalls, for example sidewalls 38a of bin 38 to bottom platform 50. The bottom platform 50 includes sockets 50a with friction ribs 50b inside the sockets, formed into, or attached to the platform. Each to sidewall 38a includes tube stubs 38rn, formed into, or attached to the sidewall and corresponding in number and position to engage into the sockets 50a in a tight fitting manner. Preferably two spaced apart tube stubs 38m and two spaced apart and corresponding sockets 50a are provided for each sidewall 38a. Any sidewall which includes upstanding walls at the side, front and back of each bin can be attached to its respective platform 50 in this manner.

Figure 16:
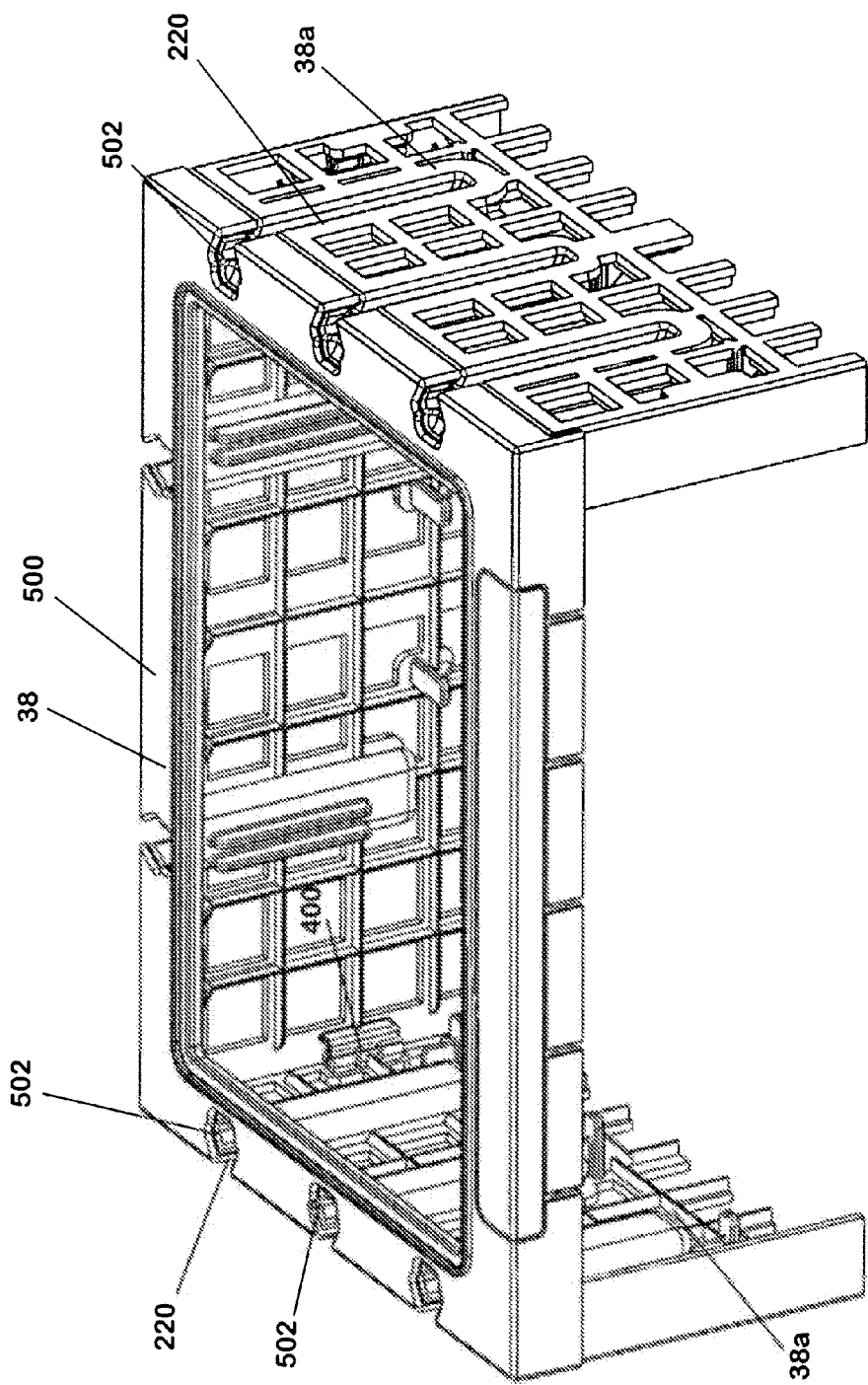
FIG. 16 is a fragmentary perspective view of a bin.
Figure 19:
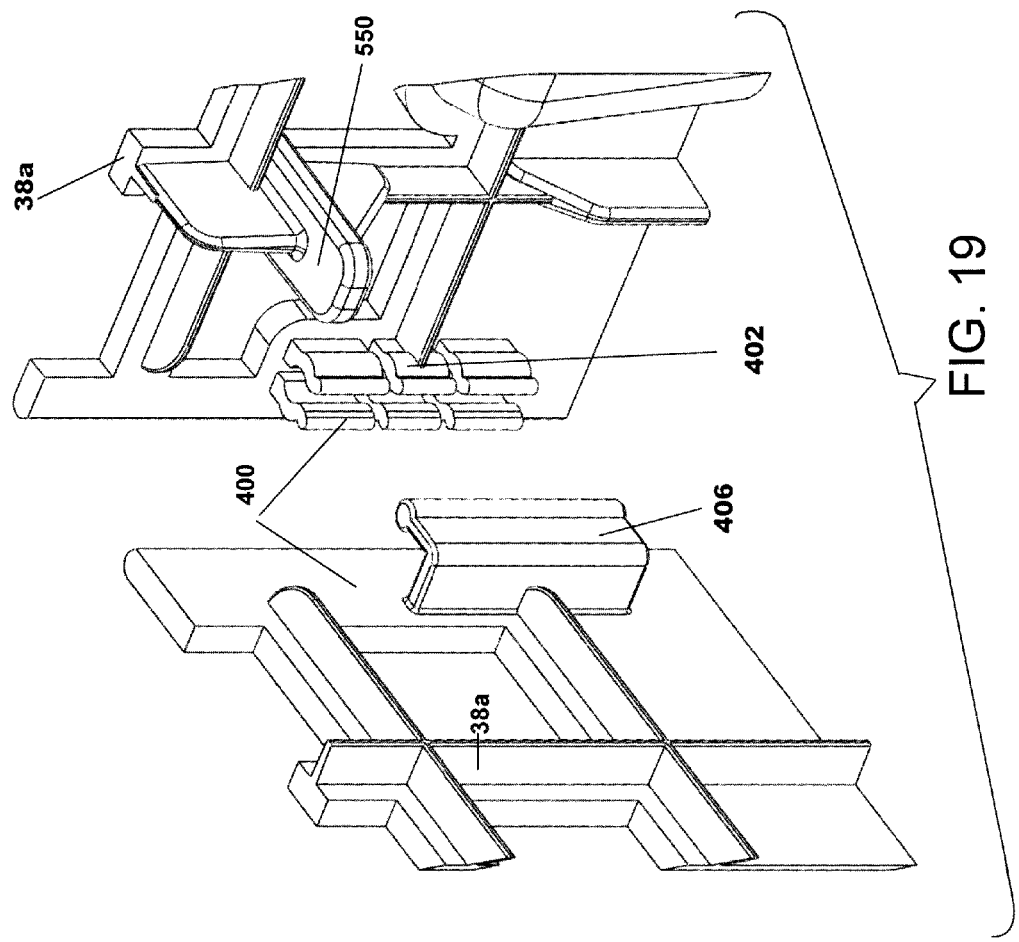
FIG. 19 is an enlarged, fragmentary exploded perspective view of a portion of 20 the sidewalls taken from FIG. 16 shown in a disassembled configuration.
Figure 20:
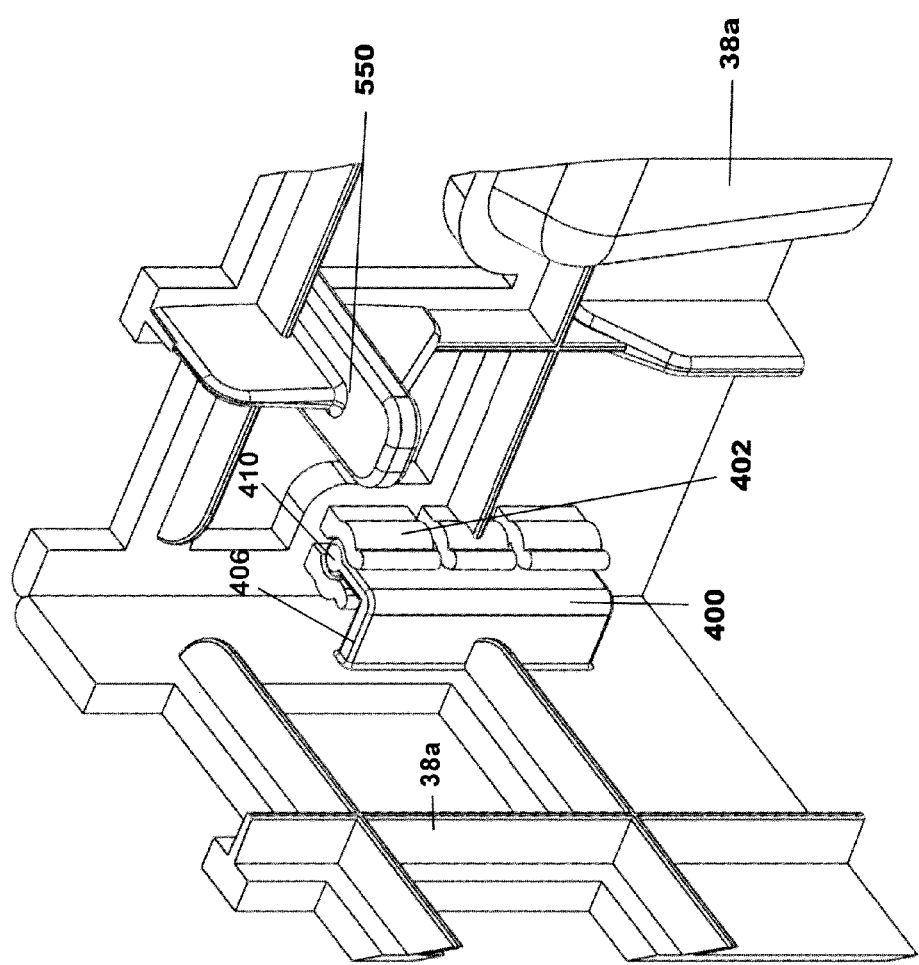
FIG. 20 is an enlarged, fragmentary perspective view of the portion of the sidewalls taken from FIG. 19 shown in an assembled configuration.

As shown in FIGS. 16, 19 and 20 the sidewalls are further connected to each other using a snap hinge arrangement 400. One of the sidewalls 38a includes a resilient receiving clamp 402 and the respective other sidewall 38a includes a right angle bracket 406 having a spindle end 410. The spindle end snap fits into the clamp 402 as shown in FIG. 20. This arrangement provides a pivot connection when assembling and disassembling the bins which may be useful for storage of the disassembled bin or for transportation. Once all four upstanding walls of a bin are connected and the bin assembled, the arrangement will effectively be non-pivoting. One or more arrangements 400 can be located at the joint between connected sidewalls.

Figure 17:
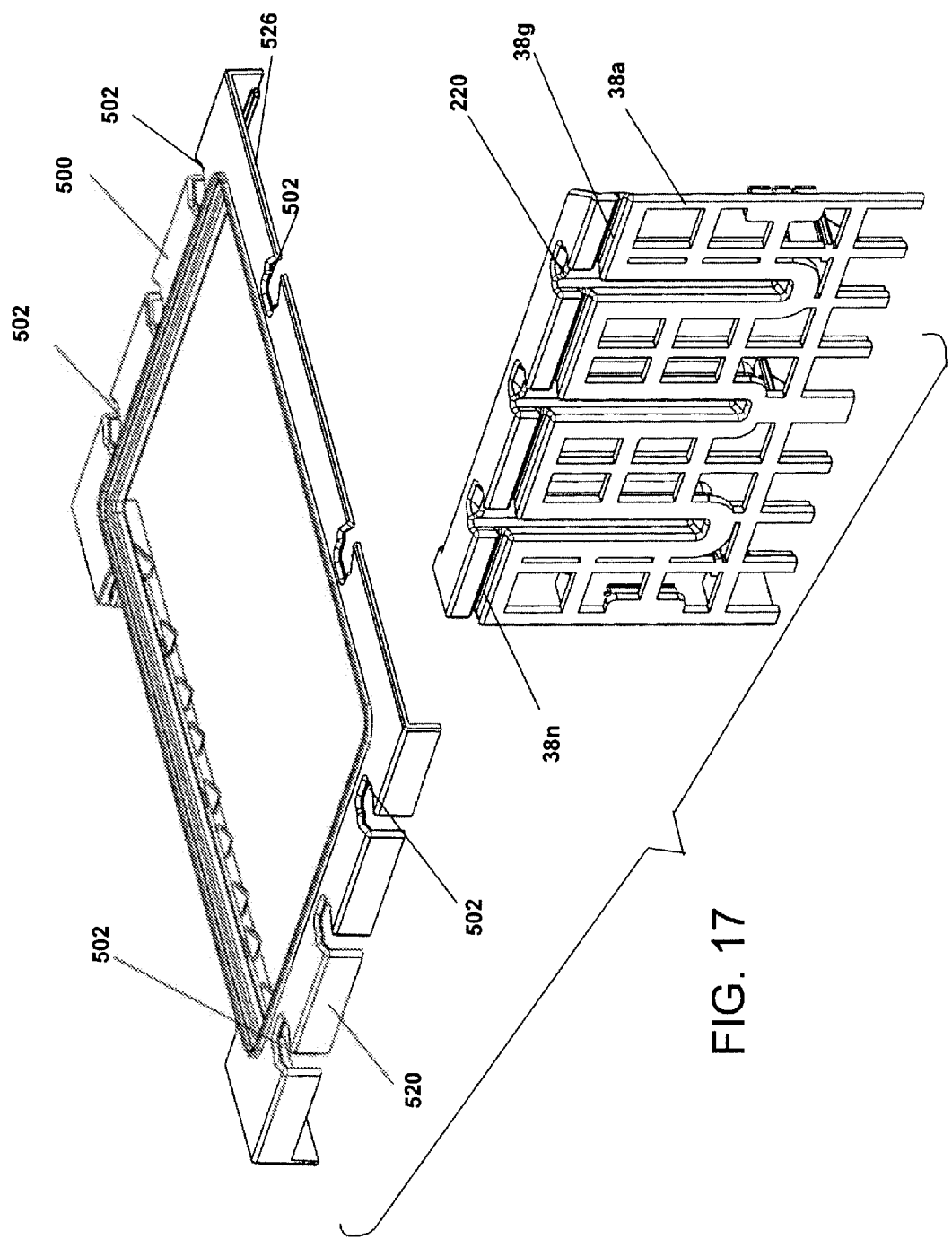
FIG. 17 is a fragmentary exploded right side, rear perspective view of the bin shown in FIG. 16.
Figure 18:
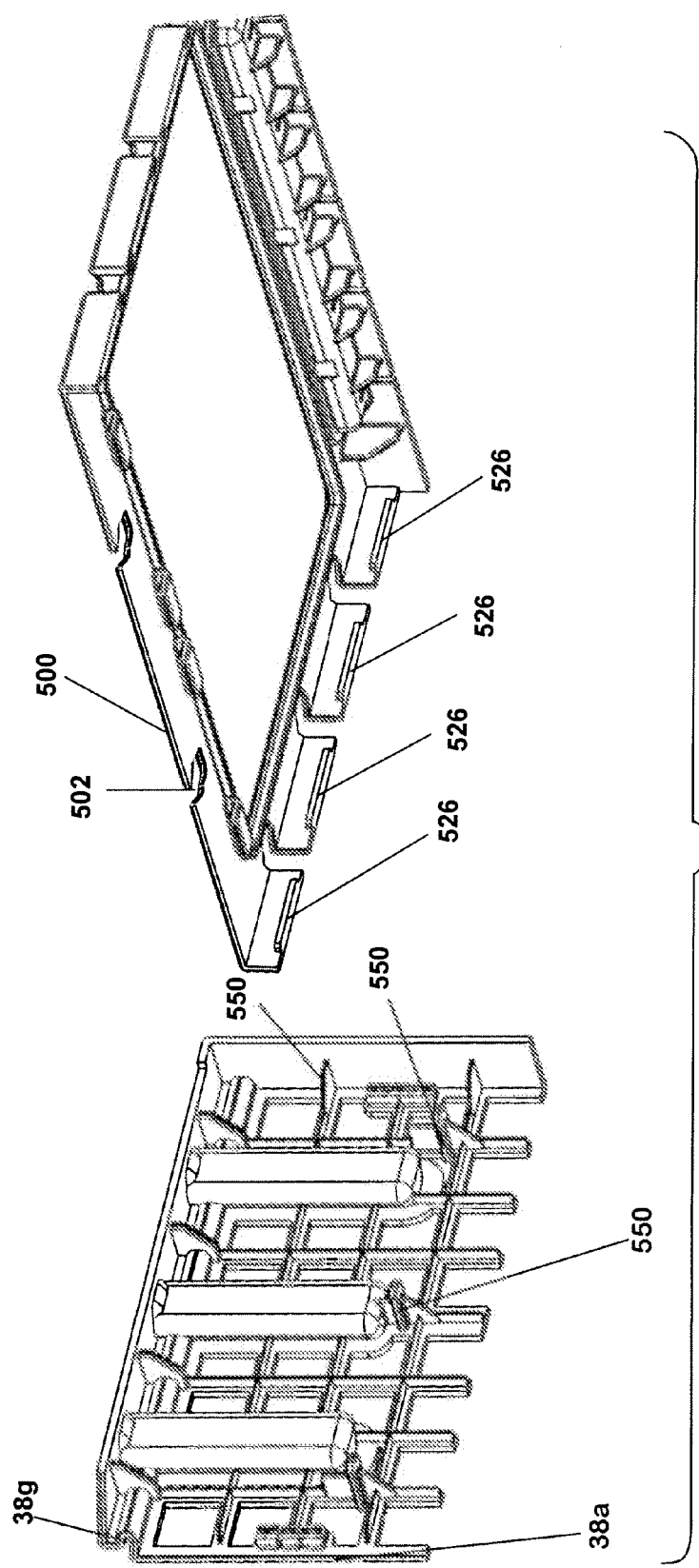
FIG. 18 is a fragmentary exploded left side, rear perspective view of the bin shown in FIG. 16.

FIGS. 16, 17 and 18 illustrate how the top plate 500 of a bin, such as the bin 38 assists in assembling and rigidifying the assembled bin. The top plate 500 includes top openings 502 that are the same shape and register with the opening 220 in the sidewalls 38a. When the connection rods 226 are inserted to secure adjacent bins, the rods also can lock the top plates 500 of the adjacent bins. Also, as shown in FIGS. 17 and 18, the top plate includes mirror image identical side flanges 520, 522 that overlie the outer top side portions 38n of each of the side walls 38a. The outer top portion includes a groove 38q that is discontinuous where the slots 220 intersect the groove 38q. The inside surface of the side flanges 520, 522 each include a discontinuous line of ribs 526 that corresponds to the discontinuous groove 38q. Thus, during assembly, the top plate 500 is slid from front to back wherein the line of ribs 526 on each of the side flanges slide into the groove 38q of opposite and parallel sidewalls 38a. When fully engaged, the openings 502 register with the openings 220 on the top of the bin.

FIG. 18 also illustrates that as typical for all the sidewalls of the storage bins, shelf supports 550 can be provided on the sidewalls 38a. The shelf supports can be snap fit into holes or other fixtures to be adjustable, of can be molded into the sidewalls at pre-determined positions.

Figure 21:
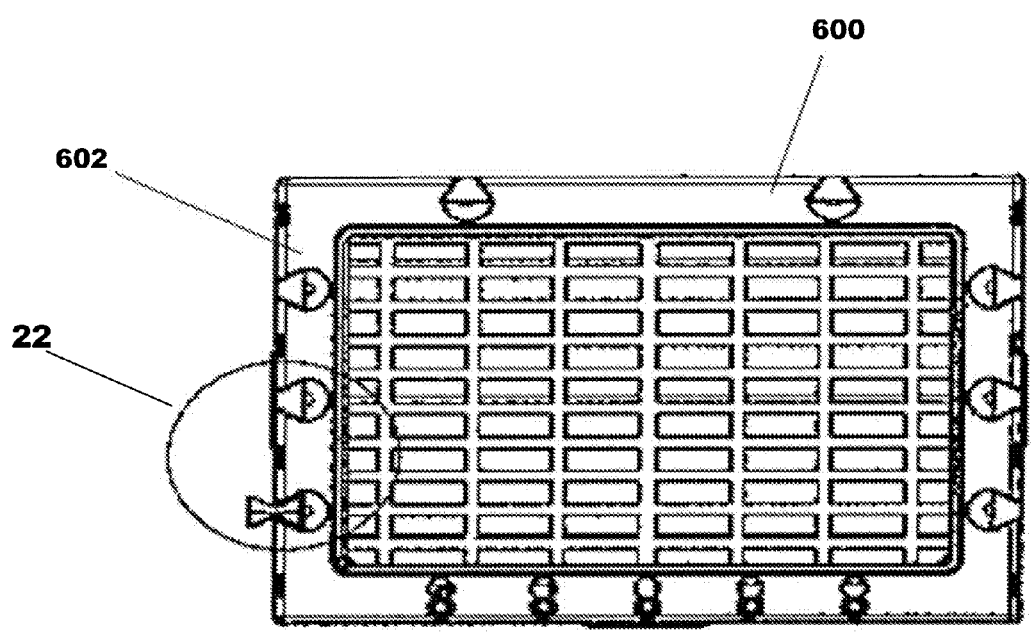
FIG. 21 is a plan view of a top plate depicting an alternate embodiment of the invention.
Figure 22:
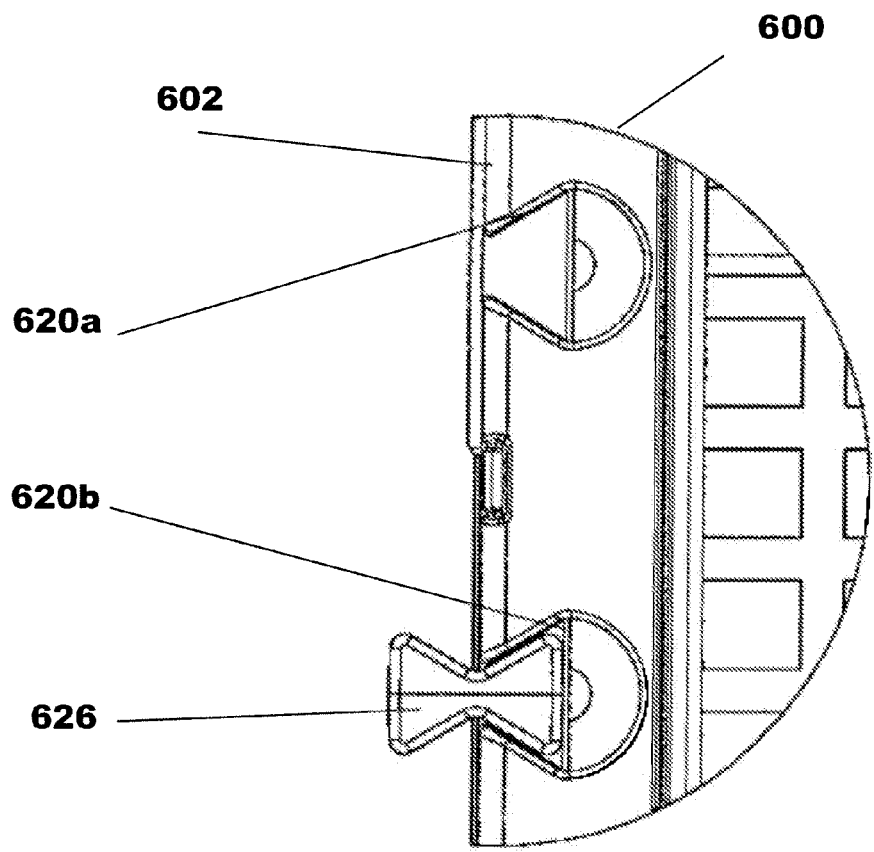
FIG. 22 is an enlarged view of area 22 of FIG. 21.

Turning to FIG. 21, a top plate 600 is shown that is similar to the top plates as discussed above in previous embodiments. The top plate 600 may be used to enclose a bin as discussed previously. The top plate includes a side edge 602. Turning to FIG. 22, an enlarged portion identified as 22 from FIG. 21 is depicted. The side edge 602 of the top plate 600 includes slots 620a,b. Each of the slots may receive a fixing rod 626. For example, fixing rod 626 is slidingly received within slot 620b. FIG. 22 depicts the slot 620a as being vacant. However, a fixing rod 626 identically shaped to that shown residing in slot 620b can be inserted in slot 620a. In an embodiment, the fixing rods are modular and may fit in any slot 620a,b (or other slots located on all sides of the bin as depicted). Once the rod 626 is slidingly inserted into the slot 620b, it may be maintained there with the dovetail-shaped open side exposed along the side edge 602, waiting for an accessory to be mounted along the open side of the fixing rod 626. Also, an adjacent bin may be secured against sidewall 602 using the open dovetail side of the fixing rod 626.

Figure 23:
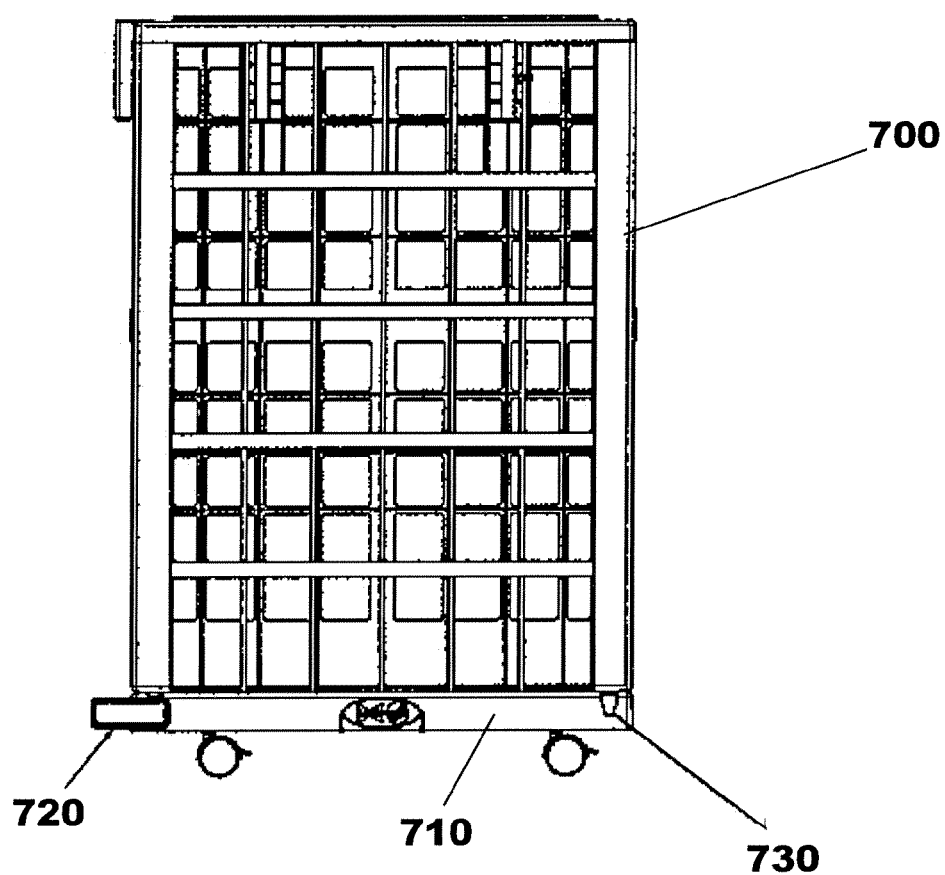
FIG. 23 is a side elevation view of a bin depicting an alternate embodiment.

Turning to FIG. 23, a bin 700 is depicted. The bin 700 is similar to the bins described above. The bin includes a base 710 and located in the base are a base slot at the left side 730 and right side. A base clip 720 is mounted in the base slot. The base slot on the left side is not visible because the base clip 720 is mated therein and covers the slot.

Figure 24:
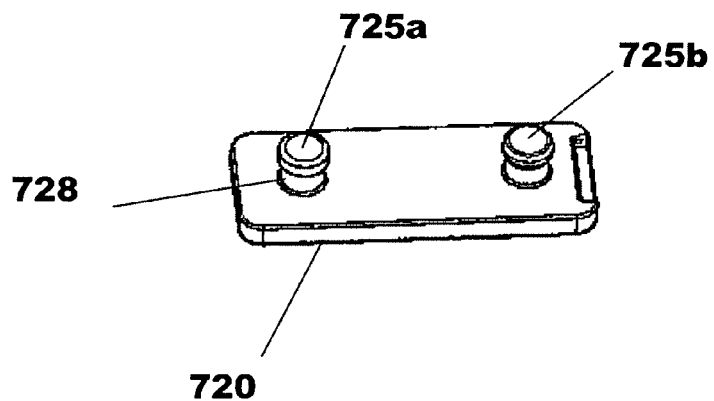
FIG. 24 is an enlarged perspective view of a base clip.

Turning to FIG. 24, an enlarged view of a base clip 720 is depicted. The base clip includes a pair of knobs 725a,b which protrude from the planer rectangular surface of the base clip 720. The knobs 725a,b are received within the slot 730 at the base 710 of a bin 700. So for example, as shown in FIG. 23, the base clip 720 has the knob 725b received in the slot on the left side of the bin 700. The knob 725a will extend beyond the side edge of the bin 700.

A second bin may be attached to the first bin 700, by using the base clip 720. A second bin is rolled up adjacent to the first bin 700, so that the base clip 720 is adjacent to the base of the second bin. The knob 725a that is exposed will be received in a base slot of the second bin. In an embodiment, the slot is generally triangular shaped with the apex of the triangle at the lowest point along the base (as shown for base slot 730). The base clip 20 is mated to the slot by inserting the knob 725a in the upper and widest part of the slot. The base clip 720 is then slid downward so that the knob 725a is received at the narrowest portion of the slot closest to the apex. In an embodiment, the knob 725a,b includes a flange 728 that has a diameter that is larger than the body of the knob 725a. It may be understood that when the knob 725a is received in the slot, the flange 728 will grasp the side edges of the slot when it is slid downward towards the apex of the triangular shaped slot. In this way the base clip 720 may securely lock a second bin to the first bin 700.

Figure 25:
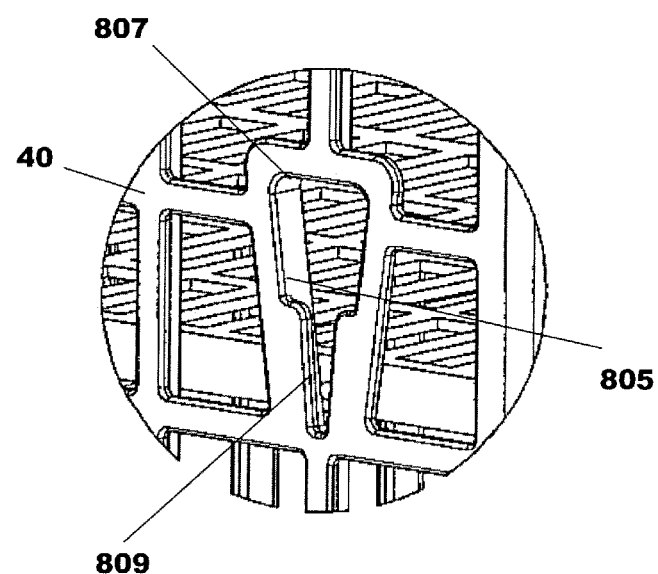
FIG. 25 is an enlarged perspective view of a side wall of a bin taken from FIG. 14.

Turning to FIG. 25, an enlarged view of a female lock portion 805 is depicted. The female lock portion 805 is formed within a wall of a bin 40. For example, as shown in FIG. 14, a bin 40 is provided. At the bottom half of the bin depicted in FIG. 14 are female locking portions. The enlarged view in FIG. 25 depicts the female locking portion 805 having an upper portion 807, and a lower portion 809. In an embodiment, the upper portion has a generally trapezoid shape in communication with the lower portion 809 that has a generally inverted triangular shape.

Figure 26:
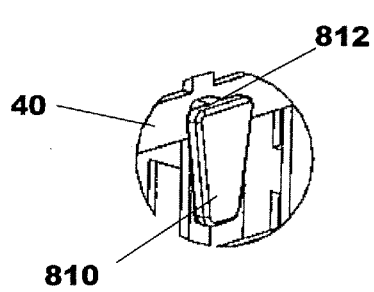
FIG. 26 is a perspective view of FIG. 25 showing a male lock mounted thereto.

Turning to FIG. 26, a male lock portion 810 is depicted mounted within the female lock portion 805. The mate lock portion 810 includes a rib 812. In order to attach the male lock portion 810 to the female lock portion 805, the rib 812 is inserted in the upper portion 807 and then the male lock portion 810 is slid downwardly so that the rib 812 is received within the lower portion 809 of the female lock 805. As the lower half 809 is narrower, it will grasp the rib 812 of the male lock 810 and secure it therein, as shown in FIG. 26. Once the lock portion 810 is secured to the bin 40, other accessories as described above, may be mounted on the lock portion 810. The accessories need only have a corresponding female lock portion 805 to engage the male lock 810. Such a female lock portion 805 for an accessory will be a bit wider as compared to the lock portion 805 of FIG. 25 due to the more narrow rib 812 compared to the outer face of the male lock portion 810.

Although various concepts have been described in detail, it would be appreciated by those skilled in the art, that various modifications and alternatives to those concepts could be developed in light of the overall teachings of the disclosure. Therefore, a person skilled in the art applying ordinary skill, would be able to practice the invention set forth in the claims without undue experimentation. It will additionally be appreciated that the particular concepts exposed herein are meant to be illustrative only and not limiting to the scope of the invention, which is to be given the full breath of the appended claims and any equivalence thereof.

From the foregoing, it will be observed that numerous variations and modifications may be effected without departing from the spirit and scope of the invention. It is to be understood that no limitation with respect to the specific apparatus illustrated herein is intended or should be inferred.

All references including publications, patent applications, and patents, cited herein are hereby incorporated by reference to the same extent as if each reference were individually and specifically indicated to be incorporated by reference and were set forth in its entirety herein, to the extent that the references are not inconsistent with the present disclosure.

The invention claimed is:

1. A storage assembly comprising:
   a fixing rod;
   a first storage bin for containing articles;
   an accessory having an attachment base; and
   a second storage bin for containing articles,
   wherein the first storage bin comprises a first slot and the second storage bin comprises a second slot such that, when the first and second storage bin are arranged side-by-side, the first and second slots are in registry, and the first and second slots receive the fixing rod to prevent separation of the first and second storage bins, each of the first slot and the second slot having a bottom formed therein to limit movement of the fixing rod in an insertion direction,
   wherein the first storage bin further comprises a third slot, the third slot formed identically to the first slot and the second slot, the third slot having a bottom formed therein, and
   wherein the attachment base of the accessory comprises a connecting portion with a cross-section that fits within the third slot to fix the accessory to the first storage bin.

2. The storage assembly according to claim 1, wherein the first and second slots have a dove tail cross-section and the fixing rod comprises a cross-section that has oppositely directed dovetail cross-sections.

3. The storage assembly according to claim 1, wherein said first storage bin comprises storage compartments having a horizontally directed opening and said second storage bin comprises at least one compartment having a vertically directed opening.

4. The storage assembly according to claim 1, wherein said accessory comprises a downwardly directed hook portion for insertion into a top opening of a golf bag to stabilize the golf bag stored adjacent to the first storage compartment.

5. The storage assembly according to claim 1, wherein said accessory comprises a shelf.

6. The storage assembly according to claim 1, wherein said accessory comprises a rack that holds baseball bats either horizontally, vertically or at a skewed angle.

7. The storage assembly according to claim 1, wherein the storage assembly comprises a platform on wheels supporting at least one of the storage bins.

8. The storage assembly according to claim 1, wherein at least one of said storage bins includes plural sidewalls and a platform and said sidewalls can be reasonably assembled from the platform by a friction connection without the use of a tool.

9. The storage assembly according to claim 8, wherein an adjacent pair of said plural sidewalls can be can be reasonably assembled together by a friction connection without the use of a tool.

10. The storage assembly according to claim 1 comprising a tube having opposite open ends and sized to receive golf balls in a vertical stack and a cup beneath the tube to receive golf balls from the tube.

11. The storage assembly according to claim 1 wherein the fixing rod comprises a first side and a second side and the first side having a shape and the second side being a mirror image of the shape and each storage bin comprising uniform slots so that the first slot and the second slot have the same shape so that the first side of the fixing rod can mate with either the first or second slots and the second side of the fixing rod can mate with either the first or second slots.

12. The storage assembly according to claim 1 wherein the first slot receives multiple components having at least a first side of a fixing rod being shaped to mate with the first slot.

13. The storage assembly according to claim 1, wherein the first storage bin includes a base and a base clip fastens to the base of the first storage bin and the base clip capable of mating the first storage bin to the second storage bin at the base in a back to back orientation.

14. The storage assembly of claim 13 wherein the base clip comprises a flat, rectangular base member having a male boss at each hand end and the base having a generally triangular shaped slot; the slot for receiving a male boss and the boss having an enlarged head and the boss sliding from a broad side of the slot toward a tapered side of the slot so that the enlarged head of the boss is trapped within the slot.

15. The storage assembly according to claim 1 wherein the first slot receives multiple components having at least a first side of a fixing rod being shaped to mate with the first slot.

16. The storage assembly according to claim 1, wherein the first storage bin includes a base and a base clip fastens to the base of the first storage bin and the base clip capable of mating the first storage bin to the second storage bin at the base.

* * * * *